No. 807,038.  
PATENTED DEC. 12, 1905.  
J. G. MacPHERSON.  
REVERSIBLE VARIABLE SPEED AND POWER TRANSMISSION MECHANISM.  
APPLICATION FILED OCT. 18, 1904.  
3 SHEETS—SHEET 1.
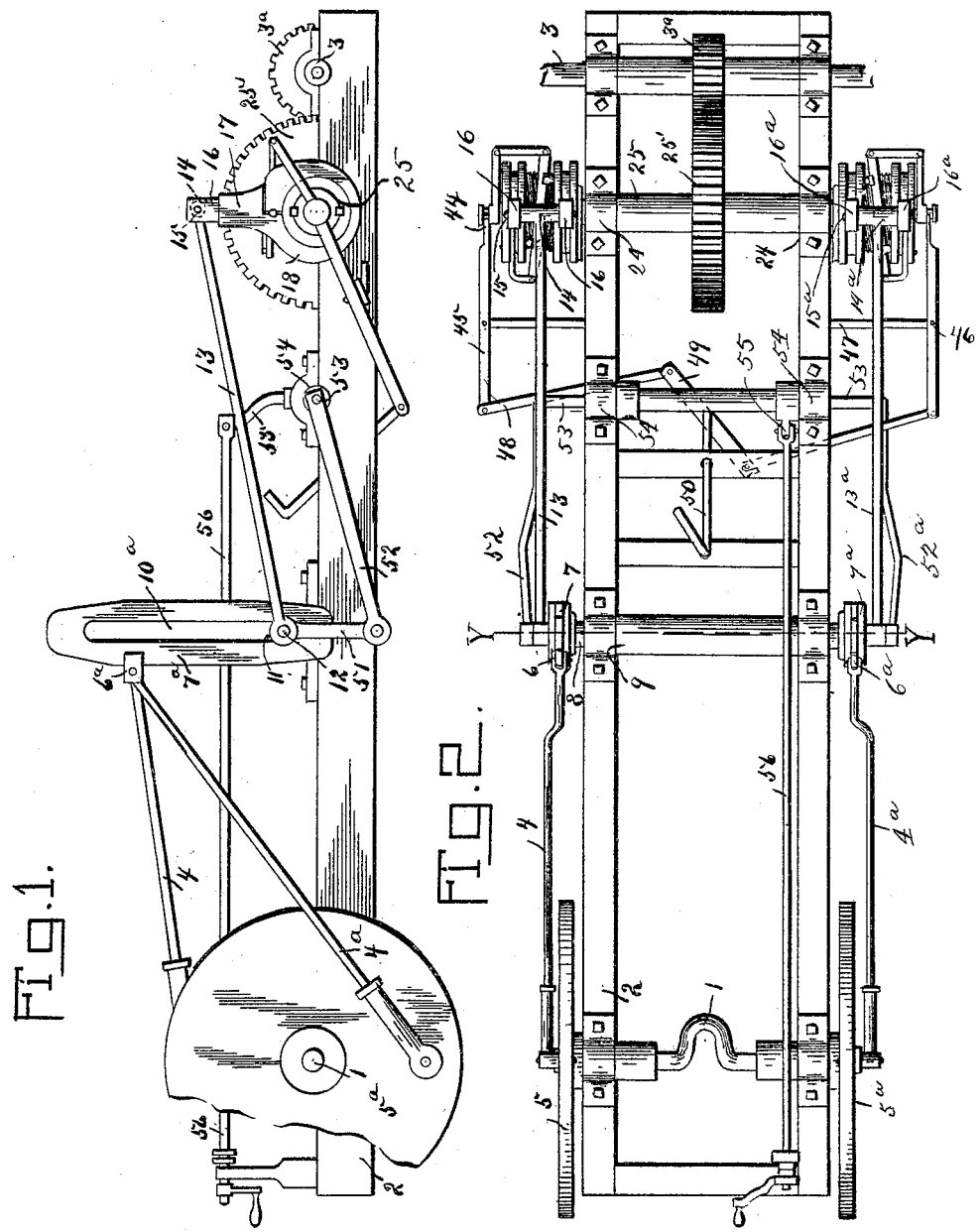
Witnesses  
J. Mason Maughury.  
M.W. Johnson.
Inventor  
John G. MacPherson.  
By David P. Moore  
Attorney No. 807,038. PATENTED DEC. 12, 1905.
J. G. MACPHERSON.
REVERSIBLE VARIABLE SPEED AND POWER TRANSMISSION MECHANISM.
APPLICATION FILED OCT. 18, 1904.
3 SHEETS—SHEET 2.
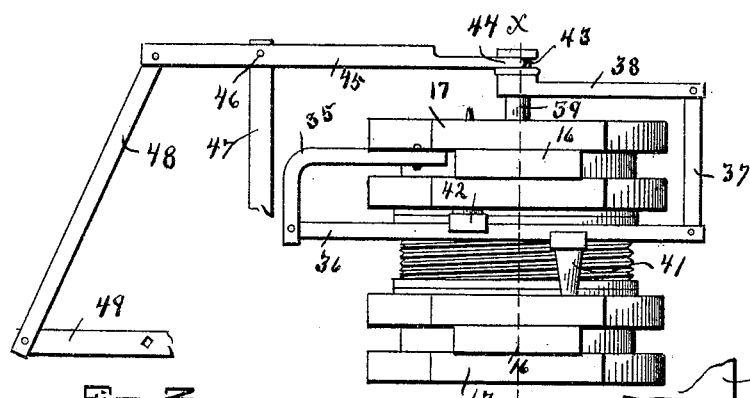
Fig.3.
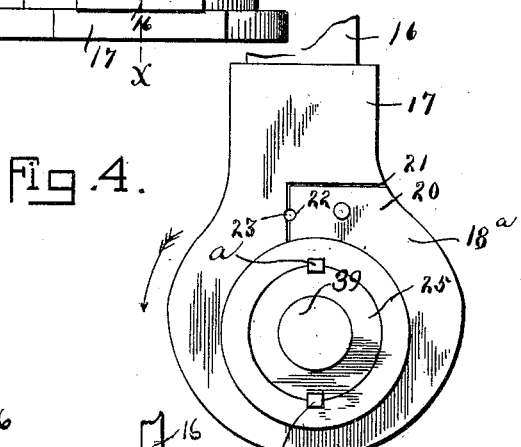
Fig.4.
Fig.5.
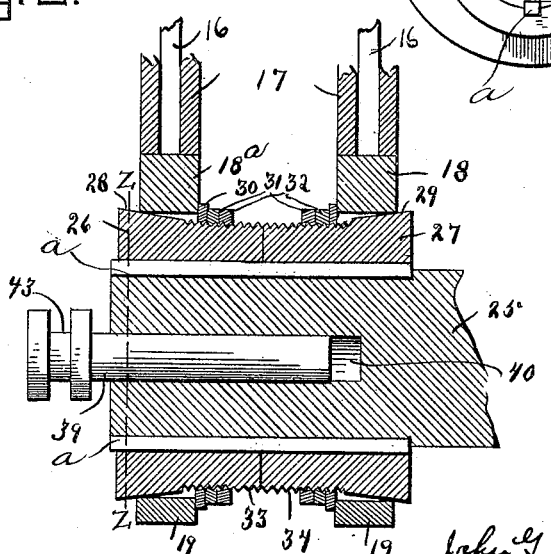
Witnesses
Inventor
John G. MacPherson.
By David P. Moore.
Attorney

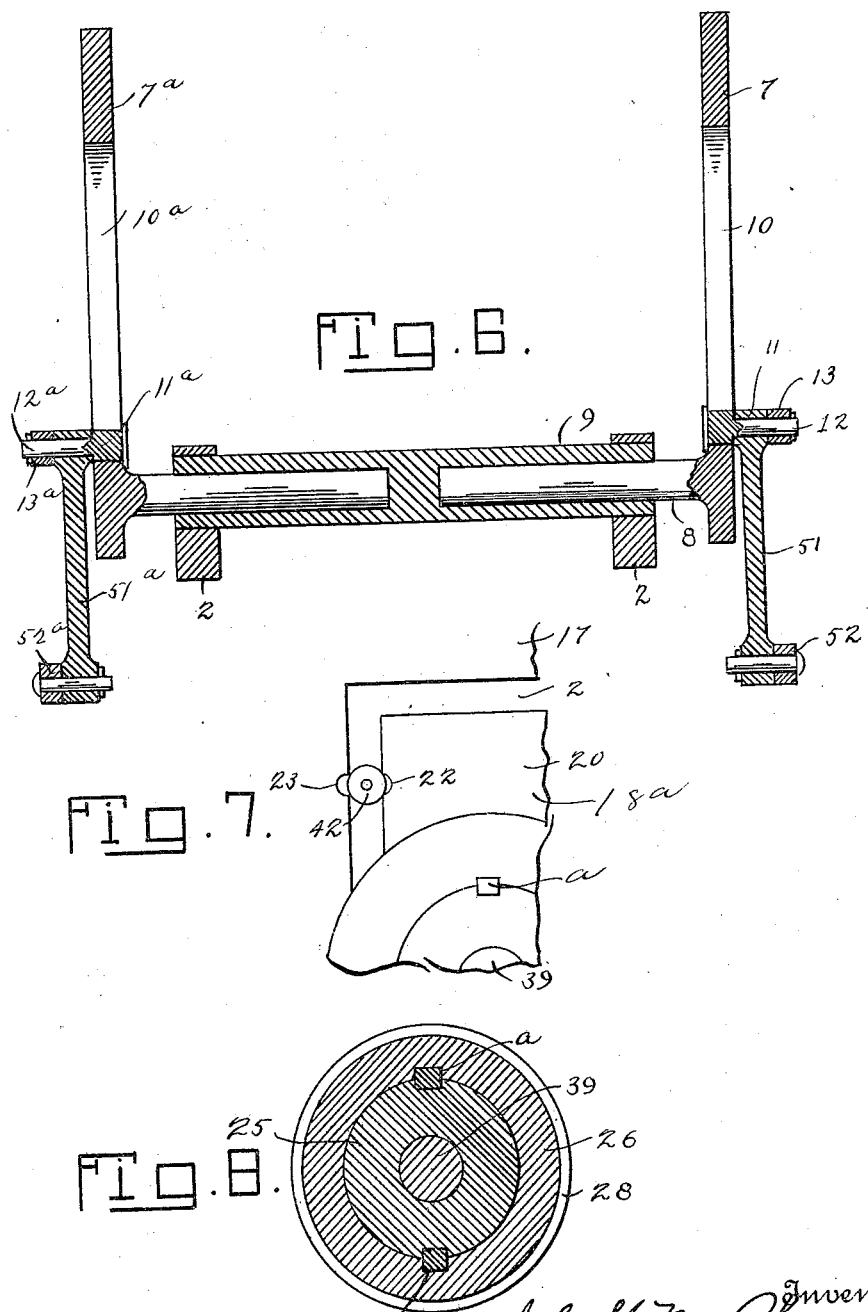

UNITED STATES PATENT OFFICE.

JOHN G. MacPHERSON, OF PHILADELPHIA, PENNSYLVANIA, ASSIGNOR, BY DIRECT AND MESNE ASSIGNMENTS, OF TWO-THIRDS TO ROBERT P. MURPHY AND ONE-THIRD TO RALPH L. GALT, BOTH OF WASHINGTON, DISTRICT OF COLUMBIA.

REVERSIBLE VARIABLE SPEED AND POWER TRANSMISSION MECHANISM.

No. 807,038.     Specification of Letters Patent.     Patented Dec. 12, 1905.

Application filed October 18, 1904. Serial No. 228,919.

*To all whom it may concern:*

Be it known that I, JOHN G. MACPHERSON, a citizen of the United States, residing at Philadelphia, in the county of Philadelphia and State of Pennsylvania, have invented certain new and useful Improvements in Reversible Variable Speed and Power Transmission Mechanism, of which the following is a specification.

This invention relates to improvements in reversible variable speed and power transmitting mechanism, and has special reference to a mechanism of this character especially adapted to be operated upon by a continuously-moving fixed-speed shaft to transmit the power at the proper speed and in the proper direction, as may be desired.

In the accompanying drawings, Figure 1 is a side elevation of my complete mechanism, the source of power and the mechanism to be operated not being shown. Fig. 2 is a top plan view thereof. Fig. 3 is an enlarged detail view of the speed-regulating mechanism. Fig. 4 is an enlarged detail view of the mechanism for operating the propelling mechanism. Fig. 5 is an enlarged detail sectional view taken on line X X of Fig. 3. Fig. 6 is a section taken on line Y Y of Fig. 2. Fig. 7 is an enlarged view of a portion of Fig. 4, showing the meeting ends of one of the spring gripping members forced apart, while in Fig. 4 they are together. Fig. 8 is a sectional view taken on line Z Z of Fig. 5.

Referring to the drawings, the numeral 1 indicates the continuously-revolving fixed-speed driving-shaft, which is suitably journaled in a base 2 at one end thereof, while at the opposite end is suitably journaled the driven shaft 3. Located upon the base and intermediate of these shafts is my reversible variable-speed mechanism. To the shaft 1 is connected any suitable propelling mechanism, preferably an explosive-engine of a fixed-speed type. This, however, is not shown in the drawings, as it is not deemed necessary. This reversible variable-speed mechanism is connected, by means of the rods 4 and $4^a$, to the fly-wheels or balance-wheels 5 and $5^a$, carried upon the outer ends of the shaft 1, the opposite ends of said rods 4 and $4^a$ being connected to the lugs 6 and $6^a$, secured upon the outer face of each of the slotted rocking frames 7 and $7^a$. These rocking frames 7 and $7^a$ have their lower ends connected to the ends of the shaft 8, which is journaled in the sleeve or bearing 9, secured upon the base intermediate of its length. From this description it will be seen that as the shaft 1 is operated the frames 7 and $7^a$ will be given alternate rocking movements. Slidably mounted within the slots 10 and $10^a$ of the frames 7 and $7^a$ are the blocks or slides 11 and $11^a$, upon whose pins 12 and $12^a$ are mounted or journaled one end of each of the connecting-rods 13 and $13^a$. The opposite ends of these rods are provided with the T-shaped bearing-sleeves 14 and $14^a$ for the reception of the pins 15 and $15^a$, each one of which connects its respective rod to one pair of the upwardly-extending arms 16 and $16^a$. Each one of these arms 16 and $16^a$ is adapted to operate one of the gripping members 18, each one of which consists of the projection 17 and the open spring-ring $18^a$, whose lower portion 19 is the thinnest part, so as to give the proper spring tension to the upper free end 20, which is adapted to fit within the recess or slot 21, formed at the base of the projection 17. The grooves 22 and 23 are formed in the abutting faces of the ring 18 and the end 20, the purpose of which will presently appear.

Journaled in bearings 24 and $24^a$ upon the base is an intermediate driven shaft 25, upon whose outer ends are keyed the oppositely-inclined pair of outer and inner coned collars 26 and 27, the same being so mounted upon the shaft 25 as to move therewith, preferably by means of keys *a*, as clearly shown in Fig. 5. Mounted upon the smooth inclined portions 28 and 29 of these collars are the gripping members 18, one to each cone, the said gripping members being arranged in pairs upon each end of the shaft 25 and in opposite directions, so that one will move freely upon its collar while the other will grip its collar tightly and rotate the shaft 25. In order to hold these gripping members upon the coned surfaces, I provide the washers 30 and the nuts 31 and 32, which are mounted, respectively, upon the threaded portions 33 and 34 of the collars. I make the collars cone-shaped, so that any wear either on them or the gripping members can be easily taken up by forcing the gripping members farther upon the collars, for if the surfaces were not inclined and the wear between the ring and collar very great it would be impossible to properly grip the surface, as the ring would at all times after a certain amount of wear rotate freely thereon, whereas with the cone-shaped surfaces the slightest bit of wear can be taken up so as to always produce sufficient gripping-surface to produce the desired result.

In order to properly operate the gripping portions so that one is free to rotate upon its collar while the other will properly grasp its collar to rotate the shaft, I provide the curved arms 35, which are secured to the outer gripping members, and to which are pivotally mounted at their free ends the oscillating levers 36, each one of whose other ends is pivotally connected to a link 37, connected to the crank-arm 38. This crank-arm 38 is rigidly secured to a sliding pin or rod 39, which is slidably mounted within the central bore 40 of the shaft 25, so that as the gripping members are moved the arms 35 are also moved therewith to always be in operative position. Carried by the levers 36 are two tapered pins or cones 41 and 42, which are adapted to aline, respectively, with the openings formed by the recesses 22 and 23 of the gripping members, so that the proper gripping members will have the cone enter the opening to force the meeting surfaces apart, and thereby release the grip of the members upon the coned collars. In order to properly operate the levers 36, I provide the slotted head 43 upon the end of the rod 39 and engage the same by means of the double-hooked end 44 of the lever 45, which is fulcrumed at 46 to a bracket 47, and has connected to its free end a connecting-link 48, which is operated upon by the cross-head 49, controlled by the rod 50. By operating the rod 50 the cross-head 49 is oscillated, so as to move the levers 36 in unison in or out, and thus simultaneously disengage one of the coned pins 42, while engaging the coned pins 41 with the proper gripping members, or vice versa.

In order to more particularly explain the operation of the pins 41 and 42, I would say that when either pair of pins are in engagement with their respective gripping members the meeting edges of the open springs of said members are spread and held apart, thus releasing the grip of the respective members upon their coned collars, while the gripping members not engaged by the pins engage snugly their coned collars, except when moved in the opposite direction to the arrow in the drawings. These gripping members are so arranged in pairs that in operating the shaft 25 one pair is released while the other engages—that is, one pair is moving in opposite direction to the other, so that one pair is always imparting motion to the shaft 25.

From the description it will be seen that as the gripping members at one time are moved in the direction of the arrow the members are free to move upon their collars; but when moved in the opposite direction if one of the pins 41 or 42 is not in engagement therewith the spring tension of the gripping portions of the members will cause the same to tightly grasp their proper collars, thereby revolving or moving the shaft 25, whose gear or pinion 25' will operate the driven shaft 3 through its pinion 3ª. These gripping members are so constructed that when their arms are pulled away from the free ends the portions thereof surrounding the collars will revolve without affecting the shaft, as this movement causes the arms to separate slightly from the terminals of the springs, so that the members will loosen their grip upon the collars; but as soon as the arms are pulled upon in the opposite direction the space between them and the springs will be closed and the springs will be clamped tightly or gripped upon the collars, so as to cause the same to revolve or move with the gripping members. I have found in operation that there is very little friction when the gripping members are moved in the direction as shown by the arrow; but the slightest movement in the opposite direction will cause the same to immediately grip the collars, so that the shaft will be moved in that direction, no matter how slight a movement may be imparted to the gripping members. By this means I dispense with toothed gearings and pawls and produce a more direct gripping device for transmitting power.

In order to regulate the speed at which the shaft 25, and consequently the shaft 3, should be turned, and consequently the throw of the levers 16, I connect the links 51 and 51ª to the pins 12 and 12ª and have secured to the other end of said links the levers or arms 52 and 52ª, whose other ends are connected to the outer ends of the shaft 53, mounted in the journals 54 upon the base, so that when the shaft's arm 55 is operated upon by means of the rod 56 the blocks 11 and 11ª are raised or lowered within the slots 10 and 10ª, so that as the frames 7 and 7ª are rocked the movement of the rods 13 and 13ª is regulated, thus regulating the speed at which the intermediate shaft 25 and the driven shaft 3 are revolved. When the blocks 11 and 11ª are in the position shown in Fig. 1, the frame 7 and 7ª can be oscillated without moving any of the other members, and even though the shaft 1 is in motion the driven shaft is passive; but as soon as the blocks 11 and 11ª are raised within the slots 10 and 10ª the gripping members are operated upon, so as to revolve the shaft 25 and the driven shaft 3. As these gripping members are arranged to work in opposite directions, one working forward and the other rearwardly, the direction in which the shaft is revolved is controlled by means of the rod 50.

In order to operate the rod 50 so as to control the direction in which the shaft is desired to be revolved, the rod 50 is turned so as to turn the cross-head 49, which in turn operates the links 48. These links 48 control the movement of the levers 45, whose free ends are connected, so as to operate upon the crank-arms 38, which control the movement of the levers 36 through the links 37, the levers 36 carrying the points 41 and 42, which are adapted to separate the open rings or allow them to close on the respective gripping members 18, the levers 36 being adapted to be oscillated in opposite direction, so as to control said gripping members.

From the foregoing description, taken in connection with the drawings, it is evident that I provide a forward-and-reversible variable speed and power transmitting mechanism, which is adapted to be connected to any continuously-revolving fixed-speed or driving shaft, so as to regulate the speed of the driven shaft to cause it to be passive or impart to it a forward or reverse motion when desired.

What I claim as new, and desire to secure by Letters Patent, is—

1. In a forward-and-reverse variable speed and power transmitting mechanism, the combination with a fixed-speed continuously-revolving driving-shaft, a driven shaft and an intermediate driven shaft, of a variable speed and power transmitting mechanism connected with the driving-shaft and the intermediate driven shaft and consisting of a pair of rocking frames for regulating the speed of the intermediate shaft, rods having one end slidably mounted in said rocking frames, so as to be limited in their forward and rearward movement, and a series of gripping members for regulating the direction of the movement of the driven shaft, said gripping members being so constructed as to grip the entire surface to which they are attached.

2. In a forward-and-reverse variable speed and power transmitting mechanism, the combination with a fixed-speed continuously-revolving driving-shaft, an intermediate driven shaft and a driven shaft, of variable speed and power transmitting mechanism, consisting of a pair of rocking frames for regulating the speed of the intermediate driven shaft, a pair of rods each having one end slidably connected to its respective rocking frame, and gripping members arranged in pairs operably connected to the other end of said rods, the said gripping members being so constructed as to grip the entire surface to which they are attached.

3. In a forward-and-reverse variable speed and power transmitting mechanism, the combination of a base, a continuously-revolving fixed-speed driving-shaft, mounted thereon, an intermediate driven shaft mounted thereon and a driven shaft mounted thereon, sliding rocking frames operably connected to the driving-shaft, oppositely-working gripping members connected to each end of the intermediate driven shaft, mechanism slidably connected to each of the rocking frames and to each pair of the gripping members for imparting motion to the gripping members and mechanism for controlling the gripping members to control the movement of the intermediate driven shaft, said gripping members being so constructed as to grip the entire surface to which they are attached.

4. In a forward-and-reverse variable speed and power transmitting mechanism, the combination of a base, a fixed-speed continuously-revolving driving-shaft mounted on one end thereof, an intermediate driven shaft and a driven shaft mounted in the other end thereof, a pair of slotted rocking frames mounted upon the base and oppositely connected to the intermediate shaft so as to be rocked simultaneously in opposite directions, two pairs of gripping members one pair of each being operably connected to the opposite ends of the driven shaft and one of each pair being adapted to coact to operate the intermediate driven shaft forward or reverse, said gripping members being so constructed as to grip the entire surface to which they are attached, mechanism for controlling the operation of said gripping members, and mechanism operably connected with the rocking frames and the gripping members for regulating the speed at which the gripping members are operated.

5. In a forward-and-reverse variable speed and power transmitting mechanism, the combination of a fixed-speed continuously-revolving driving-shaft, an intermediate driven and a driven shaft, two pairs of oppositely-arranged coned collars one pair mounted on each end of the intermediate shaft, gripping members surrounding each collar and arranged in pairs, and mechanism for varying the speed of the gripping members operably connected therewith and with the driving-shaft.

6. In a forward-and-reverse variable speed and power transmitting mechanism, the combination of a fixed-speed continuously-revolving driving-shaft, an intermediate and a driven shaft, rocking frames operably connected to the driving-shaft, gripping mechanism connected to the intermediate driven shaft for operating the same, mechanism for controlling the gripping mechanism to cause the intermediate shaft to be moved forward or reverse, and mechanism connected to the gripping mechanism and the rocking frames for varying the speed transmitted from the driving to the driven shaft, said gripping mechanism being so constructed as to grip the entire surface to which it is attached.

7. In a forward-and-reverse variable speed and power transmitting mechanism, the combination of a fixed-speed continuously-revolving driving-shaft, an intermediate driven and a driven shaft, a pair of oppositely-arranged collars mounted on each end of the intermediate driven shaft, gripping members, one to each collar adapted to surround and engage the same for transmitting motion to the intermediate driven shaft, said gripping members being arranged in oppositely-operating pairs, mechanism for varying the speed of the gripping members operably connected therewith and with the driving-shaft, and mechanism for controlling the gripping members so that two of them will operate upon the intermediate shaft while the other two are idle.

8. In a forward-and-reverse variable speed and power transmitting mechanism, the combination of a fixed-speed continuously-revolving driving-shaft, an intermediate driven and a driven shaft, a pair of oppositely-arranged collars mounted at each end of the intermediate driven shaft, gripping members, one to each collar adapted to surround and engage the same for transmitting motion to the intermediate driven shaft, said gripping members being arranged in oppositely-operating pairs, mechanism for varying the speed of the gripping members operably connected therewith and with the driving-shaft, and releasing mechanism for engaging the gripping members in pairs so that two at a time will be released from engagement with their collars.

9. In a forward-and-reverse variable speed and power transmitting mechanism, the combination of a fixed-speed continuously-revolving driving-shaft, an intermediate driven and a driven shaft, a pair of oppositely-arranged gripping members mounted upon each end of said intermediate driven shaft one of each pair adapted to operate the shaft in opposite directions from the other, mechanism for varying the speed of the gripping members operably connected therewith and with the driving-shaft, and mechanism for releasing one of each pair of the gripping members at a time for the purpose set forth.

10. In a forward-and-reverse variable speed and power transmitting mechanism, the combination of a fixed-speed continuously-revolving driving-shaft, an intermediate driven and a driven shaft, a pair of oppositely-arranged collars mounted upon each end of the intermediate driven shaft, gripping members, one to each collar adapted to surround and engage the same for transmitting motion to the intermediate driven shaft, said gripping members being arranged in oppositely-operating pairs, mechanism for varying the speed of the gripping members operably connected therewith and with the driving mechanism, and means for engaging each gripping member, said means being arranged so that two of the gripping members are operated upon at a time so that the proper pair will be released from engagement with the collars.

11. In a forward-and-reverse variable speed and power transmitting mechanism, the combination of a fixed-speed continuously-revolving driving-shaft, an intermediate driven and a driven shaft, a pair of collars mounted upon each end of the intermediate driven shaft, gripping members, one to each collar adapted to surround and engage the same for transmitting motion to the intermediate driven shaft, said gripping members being arranged in oppositely-operating pairs, mechanism for varying the speed of the gripping members operably connected therewith and with the driving-shaft, and pins arranged in pairs adapted to operate upon the gripping members for releasing the proper ones from engagement, for the purpose set forth.

12. In a forward-and-reverse variable power and speed transmitting mechanism, the combination of a fixed-speed continuously-revolving driving-shaft, an intermediate driven and a driven shaft, a pair of oppositely-arranged gripping members mounted upon each end of said intermediate shaft, one member of each pair being adapted to be operated in unison to revolve the shaft, mechanism for varying the speed of the gripping members operably connected therewith and with the driving-shaft, and a pair of pins for each pair of gripping members adapted to engage the gripping members for releasing the proper ones from engagement, for the purpose set forth.

13. In a forward-and-reverse variable speed and power transmitting mechanism, the combination of a fixed-speed continuously-revolving driving-shaft, an intermediate driven shaft and a driven shaft, a pair of oppositely-arranged gripping members mounted upon each end of said intermediate shaft, one member of each pair being adapted to be operated in unison to revolve the shaft, mechanism for varying the speed of the gripping members operably connected therewith and with the driving-shaft, and means arranged in pairs for operating upon the gripping members for releasing the proper ones from engagement, for the purpose set forth.

14. In a forward-and-reverse variable speed and power transmitting mechanism, the combination of a continuously-revolving driving-shaft, an intermediate driven and a driven shaft, means for regulating the speed of the intermediate driven shaft and mechanism for imparting motion to the intermediate driven shaft, comprising a series of gripping members arranged in pairs upon opposite ends of the intermediate driven shaft, each one of the gripping members consisting of an open spring-ring surrounding the shaft whereby when the member is pulled toward the opening in the spring-ring the shaft is gripped and motion transmitted thereto.

15. In a forward-and-reverse variable speed and power transmitting mechanism, the combination of a continuously-revolving fixed-speed driving-shaft, an intermediate driven and a driven shaft, means for regulating the speed of the intermediate driven shaft, mechanism for imparting motion thereto, comprising a series of gripping members arranged in pairs connected to the opposite ends of the intermediate driven shaft, each gripping member consisting of an open spring-ring surrounding the shaft whereby when the member is pulled toward the opening of the spring the shaft is operated and motion transmitted thereto, and mechanism for releasing said springs from said shaft adapted to enter in the opening of said springs, for the purpose set forth.

16. In a forward-and-reverse variable speed and power transmitting mechanism, the combination of a fixed-speed continuously-revolving driving-shaft, an intermediate driven and a driven shaft, means for regulating the speed of the intermediate driven shaft, and mechanism for imparting motion to the intermediate driven shaft, comprising a series of gripping members arranged in pairs upon each end of the intermediate driven shaft, each one of said gripping members having an open spring-ring surrounding the shaft whereby when the member is pulled toward the opening of the spring the shaft is operated and motion transmitted thereto and pins arranged in pairs one to each member adapted to enter in the opening of the spring to hold the spring loosely on the shaft.

17. In a forward-and-reverse variable speed and power transmitting mechanism, the combination of a fixed-speed continuously-revolving driving-shaft, an intermediate driven and a driven shaft, means to regulate the speed of the intermediate driven shaft, and mechanism for imparting motion thereto, consisting of a pair of oppositely-arranged gripping members mounted on each end of the intermediate shaft, each gripping member consisting of an upwardly-extending arm and an open spring-ring, the said ring surrounding the shaft and mechanism for entering the opening in each of the spring-rings, one of each pair at a time to allow the said gripping members to revolve freely upon the shaft.

18. In a forward-and-reverse variable speed and power transmitting mechanism, the combination of a fixed-speed continuously-revolving driving-shaft, an intermediate driven and a driven shaft, means for regulating the speed of the intermediate driven shaft, and mechanism for imparting motion to said shaft, consisting of a pair of oppositely-arranged gripping members arranged upon each end of the intermediate shaft, each gripping member consisting of an upwardly-extending arm and an open spring-ring surrounding the shaft, and pins arranged in pairs one for each member adapted to enter the opening of one member of each pair, and release the grip thereof upon the shaft.

19. In a forward-and-reverse variable speed and power transmitting mechanism, the combination of a fixed-speed continuously-revolving driving-shaft, an intermediate driven and a driven shaft, a pair of oppositely-arranged collars mounted at each end of the intermediate driven shaft, gripping members, one to each collar adapted to surround and engage the same for transmitting motion to the intermediate driven shaft, the said gripping members being arranged in oppositely-operating pairs, said gripping members each consisting of an upwardly-extending arm and an open spring-ring, said spring-ring surrounding and engaging its respective collar, mechanism for causing one member of each pair to engage the collar to revolve the shaft, and mechanism for controlling the speed of the gripping members operably connected thereto and the driving-shaft.

20. In a forward-and-reverse variable power and speed transmitting mechanism, the combination of a fixed-speed continuously-revolving driving-shaft, an intermediate driven shaft and a driven shaft, a pair of collars mounted on each end of the intermediate shaft, gripping members one for each collar, each gripping member having an upwardly-extending arm and an open spring-ring, said spring-ring surrounding its respective collar, pins arranged in pairs adapted to operate upon the gripping members for releasing the proper ones from engagement, one gripping member of each pair adapted to be operated simultaneously, the said pins adapted to control the tension of the spring-ring upon the collars so as to release the same from engagement therewith, and mechanism for varying the speed of the gripping members operably connected therewith and with the driving-shaft.

In testimony whereof I affix my signature in presence of two witnesses.

JOHN G. MACPHERSON.

Witnesses:
T. BLAIR SHOEMAKER,
DAVID P. MOORE.